Patented Jan. 20, 1925.

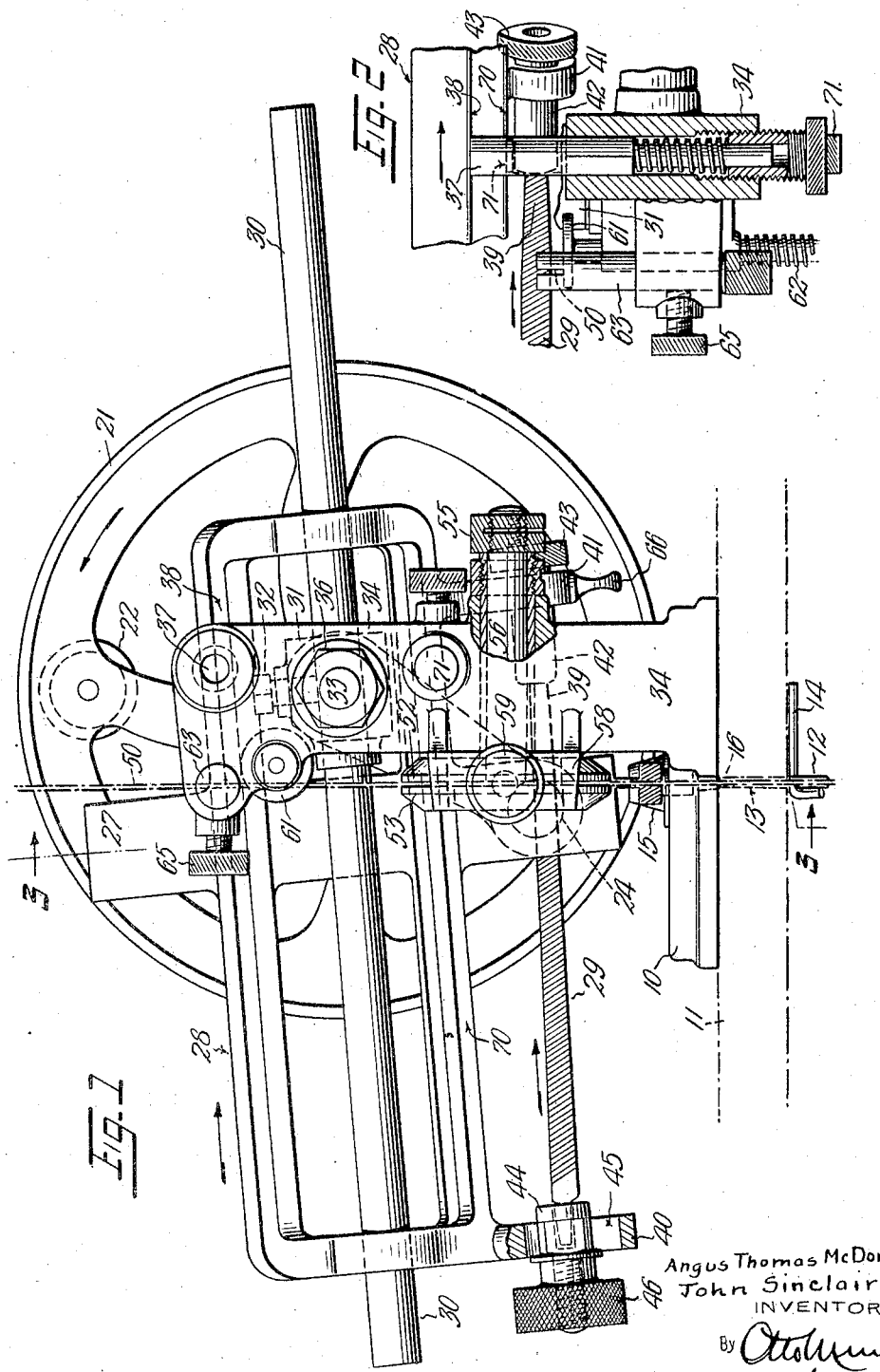

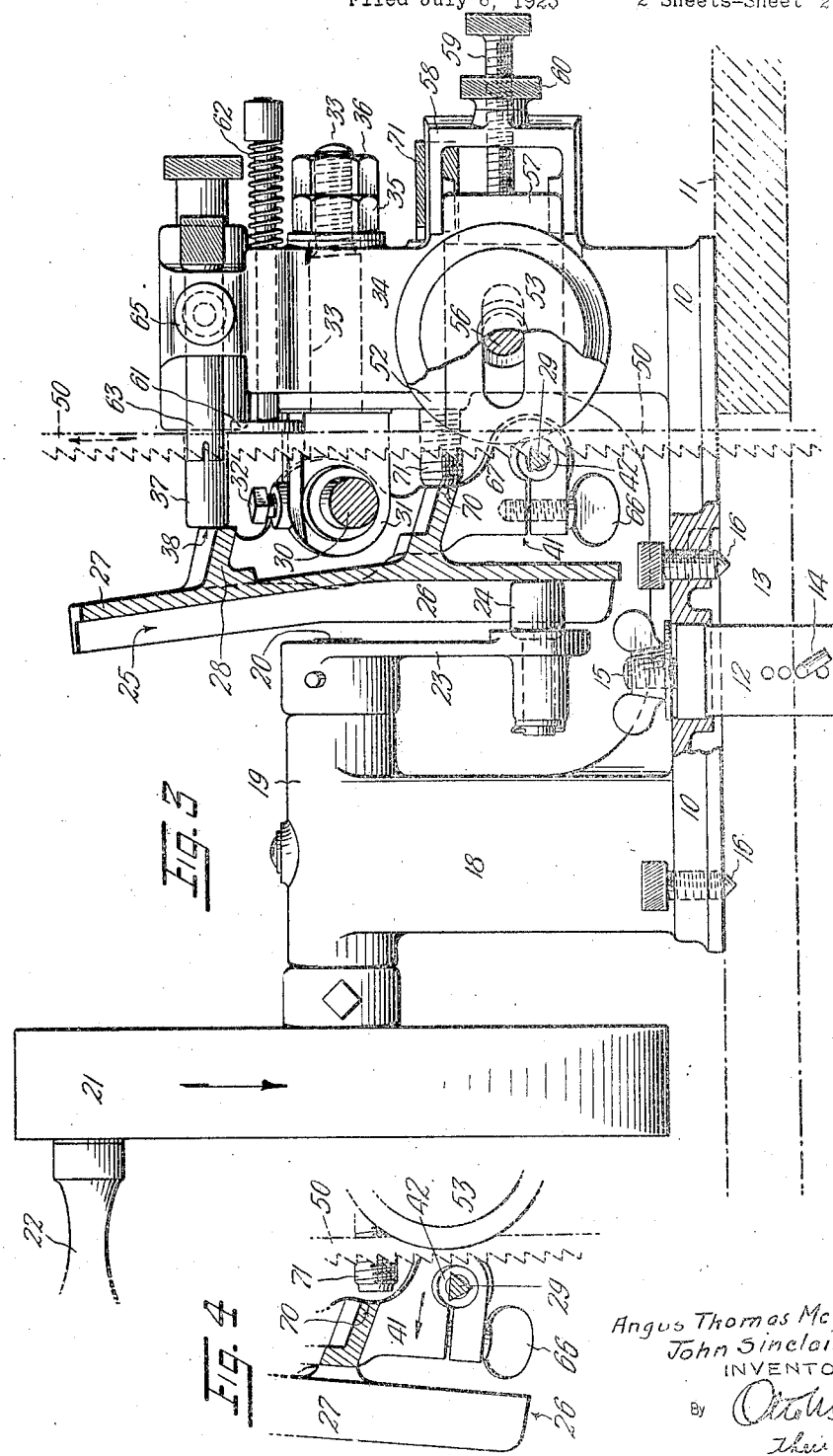

1,523,820

UNITED STATES PATENT OFFICE.

ANGUS THOMAS McDONALD, OF CHIPPENDALE, NEAR SYDNEY, AND JOHN SINCLAIR, OF DOUBLE BAY, NEAR SYDNEY, NEW SOUTH WALES, AUSTRALIA.

AUTOMATIC SAW-SHARPENING MACHINE.

Application filed July 6, 1923. Serial No. 649,902.

*To all whom it may concern:*

Be it known that I, ANGUS THOMAS MCDONALD, subject of the King of Great Britain and Ireland, residing at Strickland Flats, Chippendale, near Sydney, county of Cumberland, and State of New South Wales, Australia, and I, JOHN SINCLAIR, subject of the King of Great Britain and Ireland, residing at 23 Glendon Road, Double Bay, near Sydney, county of Cumberland, and State of New South Wales, Australia, have invented certain new and useful Improvements in Automatic Saw-Sharpening Machines, of which the following is a specification.

This invention relates to a portable machine adapted to be set up on the table of a band saw or on a circular saw table for sharpening band saws or circular saws. It is also usable similarly in connection with gang saws to operate on the several blades in the gang successively in turn, and it may be adapted for the sharpening of hand saws, cross-cut saws, and the like by providing in connection with it an appropriate carrier for supporting the saw whilst it is being operated on.

The machine is operated by a hand crank and the file is carried in a frame which is reciprocated by crank pin action. The file is mounted in this frame in the required angular relation to the saw blade to effect the sharpening cut, and is tilted according to the saw tooth centring. The crank functions to tip the frame laterally at the end of each stroke thereby to bring the file into and to withdraw it from the saw teeth successively. The machine includes adjustable guides and abutments for the saw.

The machine is illustrated in the accompanying drawings,—

Fig. 1 being a rear end elevational view taken behind the saw and showing certain parts in section;

Fig. 2 a fragmentary sectional plan of portion of the mechanism;

Fig. 3 a longitudinal sectional elevation on the line 3—3 Fig. 1; and

Fig. 4 a fragmentary sectional view showing the file carrier tilted to the release position.

The frame base 10 of the machine is flat bottomed and adapted to set on the table 11 of the saw frame or bench and to be secured thereto by means of an anchor claw 12 which is slid through a slot 13 in the bench or table 11, 14 being an anchor key inserted below the table and 15 a wing nut for tightening down the frame base 10 to the table 11. 16—16 are centering pins through the frame base 10 having their cone points engaged in the slots 13. This simple form of attachment not only secures the sharpening machine positively on the table or bench, but maintains it in correct angular relation to the plane of the saw.

Upon a bracket 18, integral with the frame base 10, a bearing 19 carries a shaft 20, on the outer end of which a fly wheel 21 is keyed, said fly wheel being fitted with a crank handle 22. At the inner end the shaft 20 carries a crank 23, and on this crank an offset crank pin 24 is mounted to work in the groove 25—26 in a cross head 27 which is integral with a frame 28 which is slidable endwise on a guide shaft 30. The shaft 30 is fixed about the middle of it to the head stock 31 by means of a pinching screw 32; the stem portion 33 of the head stock 31 is rotatably mounted in a bracket 34 which is integral with the frame base 10. 35 and 36 are nuts screwed on to the tail end of the head stock stem 33 to fix the said head stock in the bracket 34 and to hold the slide shaft 30 set in any desired angular position.

In the upper part of the bracket 34 a spring plunger 37 is mounted and arranged to bear against a shoe 38 on the back of the cross head 27. The frame 28 while slidable endwise on the shaft 30 is free to rock on said shaft for a purpose hereinafter explained.

A file 29 is carried in the lower part of the frame 28; end portions 40 and 41 of said frame 28 are extended downwardly to form the file carrying brackets. The tip 39 of the file is set into the cup 42 in the end of a cap screw 43, said cap screw being carried in the bracket 41. The tang of the file is carried in a socket 44 which is vertically adjustable in a slot 45 in the bracket 40, and is set in adjusted position in said slot by means of a milled nut 46 working on the screwed rear end of the socket piece 44. By adjustment of the socket piece 44 in the slot 45, the angular relation of the file 29 to the slide shaft 30 is adjusted. 66 is a thumb screw associated with the split jaw carrier 67 in which the cap screw 43 works; the cap screw 40 is locked by means of the screw 66; the cup in the end of the cap screw is adapted to the tip of the file and the function of the screw adjustment 66 is to lock the file in the adjusted angular position for operation on the saw teeth. For each class of saw an appropriate file would be selected and adjusted angularly in the carrier so that its faces will be appropriately presented to the saw. 50 is a band saw as it appears when carried in its driving frame; it is retained in this frame during the sharpening operation. Guides are provided to hold the saw blade squarely in relation to the file. One of these guides consists of a pair of discs 52—53, the outer disc 53 being closed up to regulate the clearance between it and the disc 52 by means of a back nut 55 which works on the rear end of the stem 56, the mounting and adjustment being such that the discs and the stem 56 are freely rotatable in a bearing in the bracket 34. A slide 57 is carried in the guide frame 58 and is movable along said guide frame by means of a lead screw 59, 60 being a set nut. The fore end of this slide forms an abutment for the back of the saw blade 50, the saw blade being supported laterally by the discs 52—53. 61 is a plunger which is forced against the back of the saw 50 by a helical spring 62, and 63 is a slotted guide through which the saw runs. The alignment of the saw is maintained by the slotted guide 63 and by the pair disc guide 52—53 and the saw is held up to its normal working line by the spring plunger 61 and the abutment plate 57 during the sharpening operation. The guide 63 is adjustable and is set by means of the pinching screw 65.

It is to be noted that the cross head 27 is bent, the upper part of it being tipped backward above the head stock 31. The end of the crank pin 24 bears against the bottom of the slots 25—26, and the rotation of the crank therefore operates not only to reciprocate the frame 29 on the slide shaft 30, but also to apply a tipping movement to the frame 29 when the crank throw is on the horizontal line.

The machine is positioned and fixed on the saw bench or saw table with the saw blade 50 located between the disc guides 52 and 53 and in the slot guide in the part 63, with the plunger 61 bearing against the back edge of the blade. The guide shaft 30 is then set by adjusting the headstock socket 31 in its bearing and fixing it in adjusted position by means of the nuts 35 and 36. The degree of angular set is the degree of angle desired on the saw tooth face. Next, the socket 44 is adjusted in the slot 45 to fix the file in the desired angular relation to the guide shaft 30, this angular relation being determined by the centring of the saw tooth and increasing proportionately with increases in the tooth centring. The file 29 is also adjusted and clamped by means of the screw 66 with its faces in correct operative relation to the saw teeth.

When the crank 22 is rotated, the crank pin is caused to work in the guide grooves 25—26 in the cross head 27, and thereby to impart to and fro movement to the frame 28 which carries the file 29. In the extreme left hand position of the parts, as seen in Fig. 1, the crank pin has tipped the frame 28 to throw the file into a tooth of the saw. As movement towards the right is continued, the crank pin still working in the lower part 26 of the groove holds the file in the saw tooth while the sharpening cut is made by the file. In this movement, owing to the file being set in the frame with its tang end higher than its tip end, a lifting movement is performed, and the saw is caused thereby to move up one tooth space. In the reverse movement, the frame is tipped to withdraw the file from the saw tooth (see Fig. 4) which has been sharpened. This tipping movement is effected by the crank pin 24 pressing against the bottom of the upper length 25 of the groove in the cross head 27, whereby the frame is rocked transversely on the slide shaft 30 against the pressure of the spring plunger 37. The stop 70 which contacts with the end of the stop screw 71 regulates the depth of cut. When the extreme left hand position is reached, the frame is again tipped transversely to swing the file into the next lower tooth space in the saw. The file movement therefore functions to advance the saw one tooth space in its frame and simultaneously to recut or sharpen one tooth in each rotation of the crank wheel 21.

What we claim as our invention and desire to secure by Letters Patent is:—

1. A saw filing machine comprising a file frame with means for fixing and angularly positioning a file therein, a guideway for said frame tiltable on a fixed support, a slotted cross-head on the back of said file frame, said cross-head bent rearwardly in its upper part, a drive shaft carrying a crank with over-hung crank pin co-acting with said cross head to apply reciprocating movement to said file frame and transverse tilting movement to it at the end of each half stroke, and means for supporting a saw blade in operative relation to a file carried in said file frame, so that in the cutting movement the file is caused to traverse a tooth space in the saw and to advance the saw blade one tooth space, and in the reverse movement the file is retired from the cut tooth space and its leading end brought back to and into alignment with the following tooth space and is moved into said tooth space in the beginning of the following cut movement.

2. A saw filing machine according to claim 1, having an adjustable slotted member in the upper part of it adapted to laterally support and form an abutment for a band saw blade, an adjustable abutment in the lower part of the machine forming an abutment for the back of said blade, and a guide for said blade comprising a rotatable disc at either side of said abutment and arranged with the peripheral portions of said discs contacting with the respective sides of said blade.

3. In a saw filing machine according to claim 1, a mounting for the guide on which the file frame is moved, having means for adjusting it to vary the angular disposition of the guide in relation to the plane of the saw.

4. In a saw filing machine according to claim 1, means for fixing a file in said frame, said means adapted to permit the file to be rotated to any desired position and tipped to any desired position in the frame and fixed in the adjusted position.

In testimony whereof we have affixed our signatures.

ANGUS THOMAS McDONALD.
JOHN SINCLAIR.